United States Patent [19]
Carpenter

[11] 3,717,048
[45] Feb. 20, 1973

[54] DEPRESSED PARK WIPER MECHANISM

[75] Inventor: Keith H. Carpenter, Kettering, Ohio

[73] Assignee: General Motors Corporation, Detroit, Mich.

[22] Filed: Oct. 4, 1971

[21] Appl. No.: 186,308

[52] U.S. Cl. ............................ 74/600, 15/250.17
[51] Int. Cl. .................................... B60s 1/24
[58] Field of Search ........ 15/250.16, 250.17; 74/600, 74/74, 75, 42

[56] References Cited

UNITED STATES PATENTS

| | | | |
|---|---|---|---|
| 3,091,128 | 5/1963 | De Rees et al. | 74/600 X |
| 3,115,599 | 12/1963 | Ziegler | 74/600 X |
| 3,197,796 | 8/1965 | Kato et al. | 15/250.17 |
| 3,242,520 | 3/1966 | Carroll et al. | 74/600 X |
| 3,665,772 | 5/1972 | Beard et al. | 74/75 |

Primary Examiner—Peter Feldman
Attorney—W. E. Finken et al.

[57] ABSTRACT

In a preferred form, this disclosure relates to an actuating mechanism for oscillating a pair of windshield wipers across the windshield between inboard and outboard positions during running operation and for moving the wipers to a depressed park position when running operation is being terminated. The actuating mechanism comprises a housing means, an annular drive member rotatably supported by the housing means, a drive shaft rotatably supported by the housing means for rotation about its axis and drivingly connected with the annular drive member and a drive means operatively connected with the drive shaft for rotating the same. The actuating mechanism further comprises a crank assembly including a crank arm which is adapted to be connected with the wipers and a crank shaft which is supported by the annular drive member at an eccentric location for both rotational and axial movement relative thereto. The actuating mechanism further includes a stationary annular cam track carried by the housing means and an eccentric cam follower means carried by the crank shaft and a means operatively connected with the cam follower means for shifting the same between a first position in which it cooperably engages the annular drive member to cause the crank shaft to be rotated in unison with the annular drive member and through an orbit of a given radius during running operation of the wipers and a second position in which said eccentric cam follower is disengaged from the annular drive member and received within the stationary cam track to cause the annular drive member to rotate relative to the crank arm to increase the throw of the crank arm to cause the wipers to be moved toward their depressed park position when wiper operation is being terminated.

3 Claims, 7 Drawing Figures

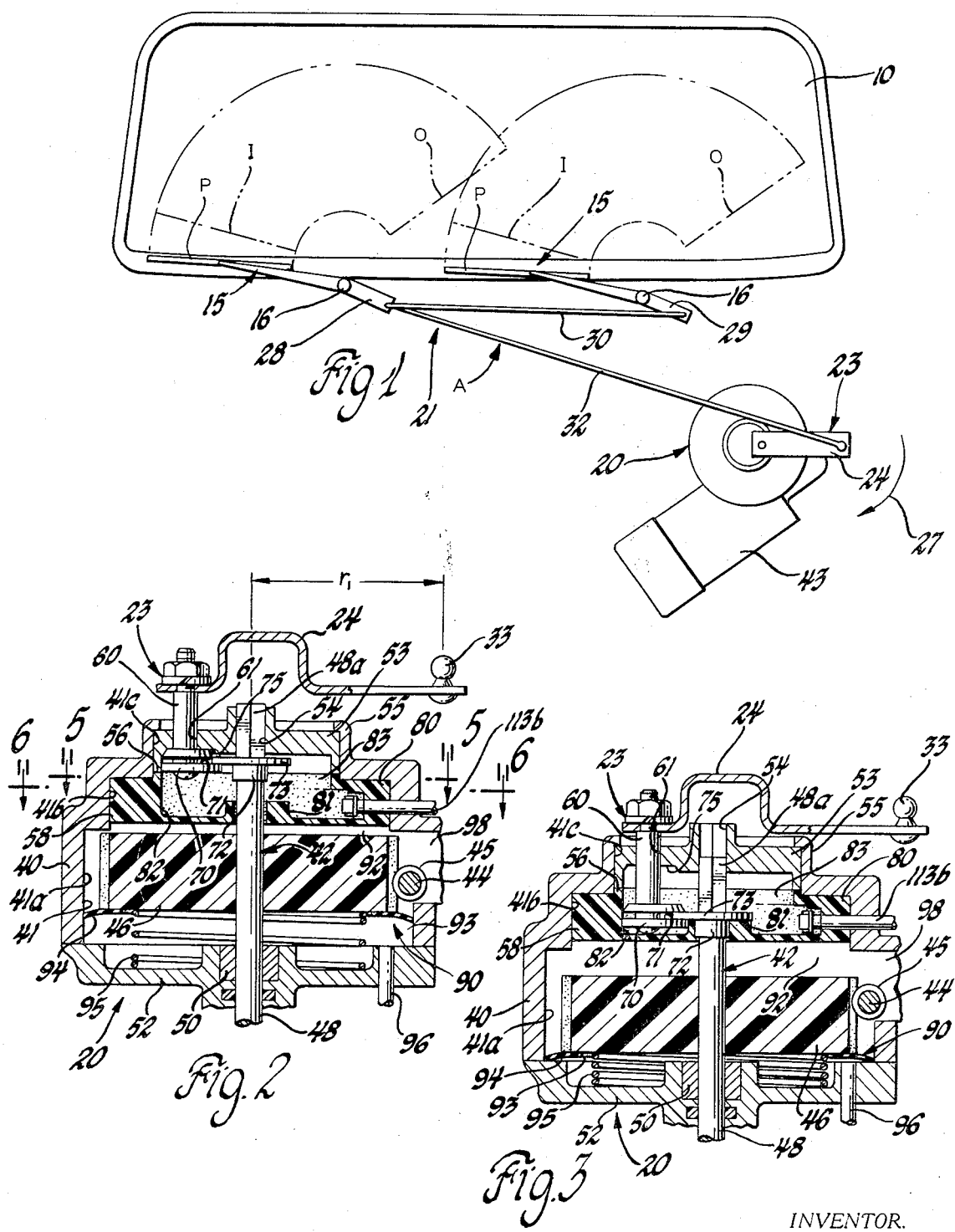

INVENTOR.
Keith H. Carpenter
BY
W. A. Schuetz
ATTORNEY

DEPRESSED PARK WIPER MECHANISM

The present invention broadly relates to a windshield wiping system, and in particular to an actuating mechanism for oscillating a pair of windshield wipers across a windshield of an automotive vehicle between inboard and outboard positions during running operation and for moving the wipers to a depressed park position spaced from the inboard position when wiper operation is being terminated.

An object of the present invention is to provide a new and improved actuating mechanism for oscillating a windshield wiper across the outer surface of a windshield between inboard and outboard positions during running operation and for moving the wipers to a depressed park position spaced from the inboard position when wiper operation is being terminated, and in which the actuating mechanism is of a relatively simple and economical construction.

Another object of the present invention is to provide a new and improved actuating mechanism for oscillating the windshield wiper across the windshield between inboard and outboard positions during running operation and for moving the wiper to a depressed park position spaced from the inboard position when wiper operation is being terminated, and in which the mechanism includes a housing means, an annular drive member rotatably supported by the housing means, a drive shaft supported by the housing means for rotation about its axis and drivingly connected to the drive member, a crank assembly including a crank arm which is adapted to be connected with the wipers and a crank shaft which is supported by the annular drive member at an eccentric location for both rotational and axial movement relative thereto, an annular stationary cam track concentric with the annular drive member, an eccentric cam follower means carried by the crank shaft and a means for shifting the crank assembly between a first position in which the eccentric cam follower means drivingly engages the annular drive member to cause the crank arm to be rotated in unison with the annular drive member through an orbit of a given radius during running operation of the wipers and a second position in which the eccentric cam follower is disengaged from the annular drive member and received within the annular cam track to cause the annular drive member to be rotated relative to the crank arm and effect an increase in the throw of the crank arm to cause the wipers to be moved to their park position when wiper operation is being terminated.

The present invention further resides in various novel construction and arrangement of parts, and further objects novel characteristics and advantages of the present invention will be apparent to those skilled in the art to which it relates and from the following detailed description of the illustrated embodiment thereof made with reference to the accompanying drawings forming a part of this specification and in which similar reference numerals or characters are employed to designate corresponding parts throughout the several views, and in which:

FIG. 1 is a schematic view of a windshield wiper system embodying the novel actuating mechanism of the present invention;

FIG. 2 is an axial cross-sectional view, with portions shown in elevation, of the preferred embodiment of the actuating mechanism of the present invention;

FIG. 3 is a view like that shown in FIG. 2, but showing different parts thereof in different positions;

Figure 4:
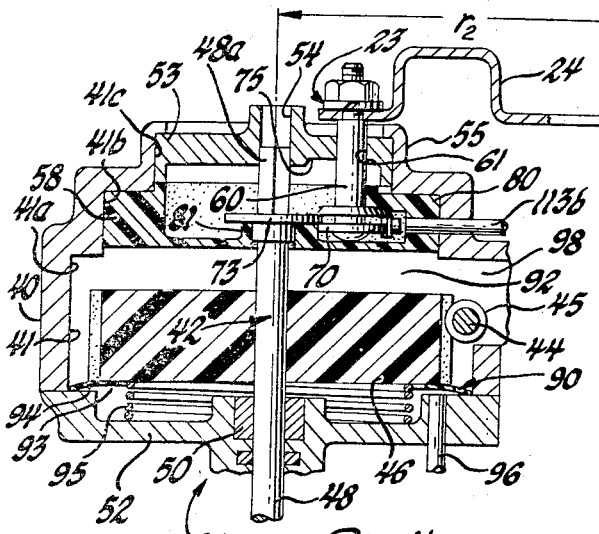
FIG. 4 is a view like that shown in FIG. 2, but showing different parts thereof in different positions.
Figure 5:
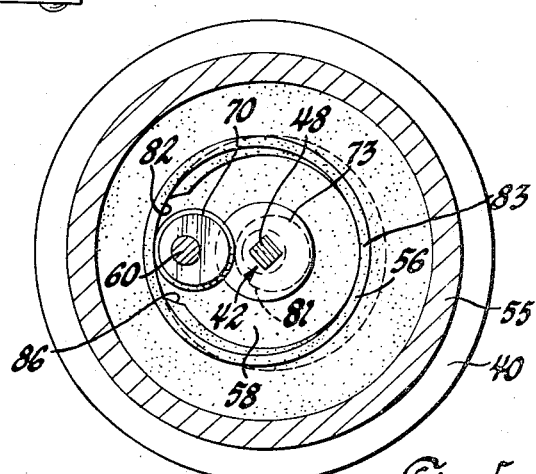
FIG. 5 is a fragmentary sectional view taken approximately along line 5—5 of FIG. 2.
Figure 6:
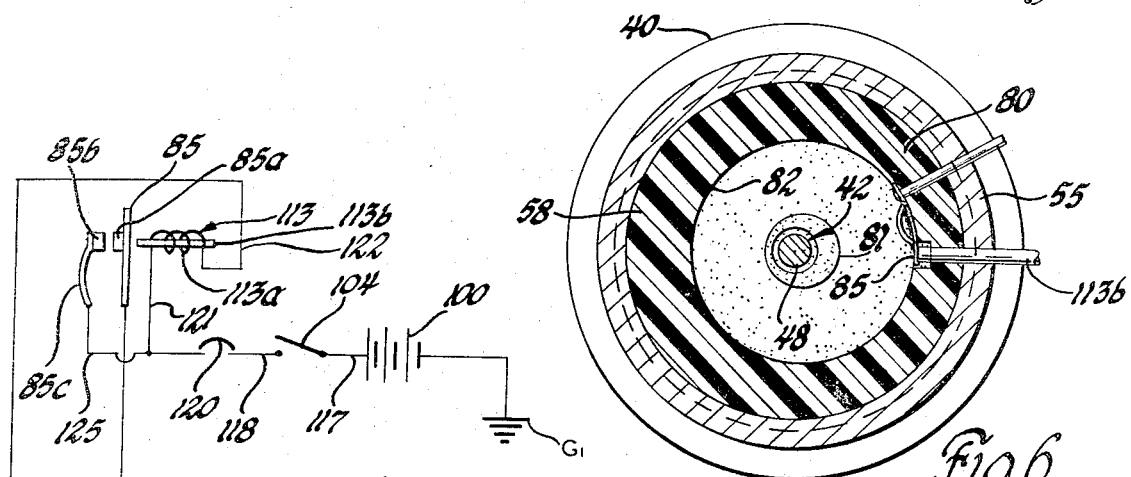
FIG. 6 is a fragmentary sectional view taken approximately along line 6—6 of FIG. 2.

The present invention provides a novel actuating mechanism for use in a windshield wiping system for oscillating a pair of windshield wipers across the outer surface of the windshield between inboard and outboard positions during running operation and to a depressed park position spaced from the inboard position when wiper operation is being terminated.

As representing a preferred embodiment of the present invention, FIG. 1 of the drawings schematically shows the windshield wiping system A for wiping a windshield 10 of an automotive vehicle (not shown). The windshield wiping system A comprises a pair of suitable or conventional windshield wipers which are drivingly connected to drive pivot 16. The drive pivots are adapted to be rotatably supported by the body structure of the vehicle (not shown) at spaced locations adjacent the lower edge of the windshield 10.

The wipers 15 are adapted to be oscillated in tandem across the outer surface of the windshield 10 between inboard and outboard positions, designated by the letters I and 0 in FIG. 1 of the drawings, during running operation and are adapted to be moved from their inboard position I to a depressed park position P adjacent the lower edge of the windshield 10 when running operation is being terminated.

The wipers 15 are actuated or oscillated between their inboard and outboard positions and to their park position P by a novel actuating mechanism 20 via a transmission linkage means 21. The novel actuating mechanism 20 includes a rotatable crank assembly 23 having a crank arm 24 which is rotated in the direction of the arrow 27. The transmission linkage 21 comprises a pair of crank arms 28 and 29 having one end fixed to one of the drive pivots 16 and the other end swivelly connected to a cross link 30. The transmission linkage also includes a drive link 32 which is swivelly connected to the crank arm 28 at one end and with the other end being swivelly connected to a ball 33 carried by one end of the crank arm 24 (see FIG. 2). Rotation of the crank arm 24 in the direction of the arrow 27 causes the transmission linkage 21 to be reciprocated to cause the wipers 15 to be oscillated in tandem across the outer surface of the windshield 10.

The crank arm 24 has an effective radius $r_1$ during running operation which causes the wipers 15 to be oscillated between their inboard and outboard positions I and O. When wiper operation is being terminated and the wipers 15 reach their inboard position the thrown or radius of the crank arm is increased to $r_2$ to cause the wipers to be moved to their depressed park position P.

The novel actuating mechanism 20 comprises a metal casting or housing 40 having an opening 41 therein. The opening 41 has first, second and third diameter portions 41a—41c which progressively decrease in diameter preceding from their lower end toward the upper of the housing 40, as viewed in FIG. 2.

The housing means 40 supports the drive assembly 42. The drive assembly comprises a unidirectional D.C. motor 43 whose output or armature shaft 44 is fixed to a worm 45. The worm 45 is in meshed engagement with the worm gear 46 fixed to a drive shaft 48. As shown in FIG. 2, the drive shaft 48 is rotatably supported adjacent its lower end via a bearing 50 carried by an end cap or cover 52 suitably secured to the housing 40 at its lower end. The drive shaft 48 is also drivingly connected at its upper end to annular drive member or bearing cap 53 rotatably supported by the housing at its upper end. The drive shaft 48 includes a non-circular portion 48a which is received in the complementary shaped opening 54 in the drive member 53 to provide a driving connection therebetween. The drive shaft 48 is also axially shiftable within the opening portion 54 of the annular drive member 53 and relative to the cover 52. The axial extent of the worm gear 46 is such that the worm gear 46 can be shifted with the drive shaft 48 while maintaining its meshed engagement with the worm 45.

The annular drive member 53 is held against relative axial movement by a flange 55 on the housing 40 at its upper end and by an annular rib 56 on a stationary cam track 58 carried by the housing 40 at the diameter portion 41b. The drive shaft 48 and the annular drive member 53 are concentric and when the electric motor 43 is energized the drive shaft 48 and the annular drive member 53 are rotated within the housing about the longitudinal axis of the drive shaft 48 and annular drive member 53.

The crank assembly 23 is rotatably and eccentrically supported by the annular drive member 53. The crank assembly 23 is also supported for movement axially of the drive member 53. The crank assembly 23 comprises the crank arm 24 which has one end thereof secured to a crank shaft 60, the crank shaft being rotatably and slidably received within an eccentric opening 61 in the drive member 53. The longitudinal axis of the crank shaft 60 is spaced from, but extends parallel to the longitudinal axis of the drive shaft 48 and the annular drive member 53. The crank assembly further includes an annular cam follower or can follower means 70 eccentrically carried by the crank shaft 60. The cam follower 70 has its axis parallel to but spaced from the axis of the crank shaft 60 and has an annular peripheral groove 71 therein. The drive shaft 48 has suitably secured thereto a collar 72 having a peripherally extending flange 73 which is received within the groove 71 in the cam follower 70.

The crank assembly 23 is shiftable axially of the annular drive member 53 between first and second positions. When in its first position, as shown in FIG. 2, the cam follower 70 is received within the complementary shaped recess or opening 75 in the annular drive member to drivingly connect the crank assembly to the annular drive member 53. When the crank assembly 23 is drivingly connected to the annular drive member 53, it is rotated in unison with the annular drive member about the axis of the annular drive member 53 and with the crank arm 24 being rotated through an orbit having an effective radius $r_1$. When the crank arm has an effective radius $r_1$ the wipers are oscillated between their inboard and outboard positions I and O.

When the cam follower 70 is shifted from its first position, as shown in FIG. 2, towards its second position, as shown in FIG. 3, it is disengaged from the annular drive member 53 and is received by the annular cam track 58. The cam track 58 is formed in an annular plastic member 80 carried by the housing 40 and the cam track is eccentric with respect to the axis of the drive shaft 48 and the annular drive member 53. The cam track 58 is defined by annular side walls 81 and 82 and a radially extending top wall or flange 83 concentric with the axis or rotation of the drive member 53. The flange 83 is cut out or cut away to define a gap or recess 86 along a portion of its annular extent. The cam follower 70 can enter the cam track 58 only when it is aligned with the cut out portion 86, which alignment occurs when the wipers are in their inboard position I and the crank assembly 23 is in the position shown in FIG. 3. Thus, when the cam follower 70 is shifted from its first position toward its second position, as shown in FIG. 3, upon termination of wiper operation, the cam follower 70 will engage the annular flange 83 until it is aligned with the cut out portion 86 at which time the wipers will be in their inboard position I.

When the cam follower 70 moves through the cut out portion 86 and is in the cam track 58, continued rotation of the annular drive member 53 will cause the same to be rotated relative to the crank assembly 23. This is because the eccentric cam follower 70 must follow the contour of the cam track 58. As the annular drive member 53 rotates, the crank assembly 23 rotates about the axis of the crank shaft 60 in the opposite direction, since the eccentric cam follower 70 must follow the contour of the eccentric cam track 58. During this relative movement the crank arm 24 remains, in effect, in the same disposition it had when the wipers 15 reached their inboard position I except that the crank arm 24 is radially shifted from its position shown in FIG. 3 toward its position shown in FIG. 4 to increase the throw of the crank arm to $r_2$. When the annular drive member 53 has been rotated 180° subsequent to the cam follower 70 being received within the cam track 58 when the wipers are in their inboard position, the eccentric cam follower 70 will trip a park switch 85 carried by the cam track to de-energize the wiper motor 43, and in a manner to be hereinafter more fully described.

When wiper operation is initiated and the wipers 15 are in their park position, the relative position of the parts are as shown in FIG. 4. When wiper operation is initiated the annular drive member 53 is rotated in the direction of the arrow 27. During the first 180° of rotation of the annular drive member 53, the cam follower 70 follows the contour of the cam track 58 until it is aligned with the cut out portion 86 whereupon it is adapted to be shifted from its second position toward its first position, as shown in FIG. 2. During this relative movement the effective radius of the crank arm is reduced from radius $r_2$ to radius $r_1$ which causes the wipers 15 to be moved from their park position P toward their inboard position I. The crank assembly is prevented from being moved toward its first position, as shown in FIG. 2, during this relative movement due to the engagement between the cam follower 70 and the flange portion 83 of the cam track 58.

The crank assembly 23 is adapted to be shifted between its first and second positions by a shiftable means 90. The shiftable means 90 comprises the worm gear 46 which serves as a piston and divides the opening portion 41a into upper and lower chambers 92 and 93. The worm gear 46 carries an annular seal 94 at its lower end which peripherally engages the opening portion 41a of the housing 40.

The shiftable means 90 is normally biased toward the position shown in FIG. 2, which is also the position of the parts during running operation of the wipers 15. The shiftable means 90 is biased to the position shown in FIG. 2 by a compression spring 95 having one end in abutting engagement with the lower side of the worm gear 46 and its other end in abutting engagement with the cover 52. The worm gear 46 can slide vertically relative to the worm 44 while maintaining its meshed engagement and when the worm gear 46 is in the position shown in FIG. 2, the collar 72 secured to the shaft 42 holds the eccentric cam follower 70 within the opening 75 of the annular drive member 53.

The shiftable means 90 is adapted to be moved downwardly from its position shown in FIG. 2 towards its position shown in FIG. 3 when wiper operation is being terminated. This downward movement of the shiftable means is effected by communicating the chamber 93 with a vacuum source, such as the inlet mainfold of the vehicle, via a conduit 96. The upper chamber 92 is vented at all times to the atmosphere via port 98. When vacuum pressure is applied to the chamber 93, the worm gear 46 is caused to be moved downwardly in opposition to the biasing force of the compression spring 95. As the worm gear 46 is caused to be moved downwardly the shaft 48 and collar 72 secured thereto is caused to be moved downwardly. Downward movement of the collar 72 causes the cam follower 70 to be moved downwardly from its position shown in FIG. 2, toward its position shown in FIG. 3.

Operation of the windshield cleaning system A will be described with reference to the schematic control circuit means or diagram shown in FIG. 7. Control circuit means includes a D.C. battery 100 having one terminal connected via a wire conductor to ground $G_1$, the park switch 85 for the wiper motor 43, the electric wiper motor 43 which includes an armature 101 and series and shunt field windings 102 and 103, respectively, an ignition switch 104, a resistor 105, a manually operated wiper switch 107 having stationary terminals 108 and 110 and a movable bridging member 112, a park switch relay 113 and a valve means 114 for selectively communicating the chamber 93 with either the atmosphere or the inlet manifold.

The wiper switch 107 could be of any suitable or conventional construction. The movable bridging member 112 of the wiper switch 107 is movable between an off position, a low speed position, and a high speed position. The park switch 85 includes a stationary contact and a mobile contact 85b carried by a leaf spring 85c which is self-biased toward a closed position in which the contacts engage each other, but which is normally held in an open position by the cam follower 70 when the windshield wipers 15 are in their park position P, as shown in FIG. 4.

Figure 7:
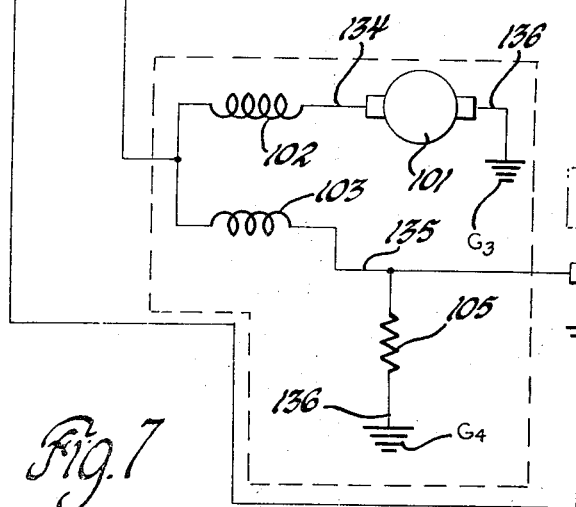
FIG. 7 is a schematic view of a control circuit means for controlling operation of the actuating mechanism of the present invention.

When the operator of the vehicle desires low speed operation of the windshield wiping system A, he will move the bridging member 112 of the wiper switch 107 from its off position to its low speed position, as shown by the dotted lines in FIG. 7. Movement of the bridging member 112 to its low speed position also causes the valve means 114 to be moved, since the valve actuator 115 is operatively connected with the bridging member 112, to its open position in which it communicates the atmosphere with the chamber 93 via conduit 96. With the chamber 93 in communication with the atmosphere the spring 95 biases the shiftable means 90 towards its first position, as shown in FIG. 2. However, since the cam follower 70 is located beneath and in engagement with the flange 83 of the cam track 58, the shiftable means will remain in the position shown in FIG. 4 until the cam follower 70 is located within the cut out 86.

When the bridging member 112 is in the low speed position an electric circuit is completed for energizing the park switch relay 113. This circuit is from battery 100, wire 117, now closed ignition switch 104, wire 118, circuit breaker 120, wire 121, relay coil 113a of the relay 113, wire 122, stationary contact 108, bridging member 112, wire 123, to ground $G_2$. Energization of the park switch relay 113 causes the core 113b thereof to move the leaf spring 85c and its associated contact 85b into engagement with the stationary terminal 85a to close the park switch 85. The closing of park switch 85 completes circuits for energizing the series and shunt field winding 102 and 103 and armature 101 of the wiper motor 43. These circuits are from battery 100, wire 117, now closed ignition switch 104, wire 118, circuit breaker 120, wire 121, park switch 85, wire 125, series field winding 102, wire 134, armature 101, wire 136, to ground $G_3$, and from wire 125, shunt field windings 103, wire 135, stationary contact 110, bridging member 112, wire 123 to ground $G_2$. In the low speed position the shunt field windings 103 are fully energized. The completion of these circuits energizes the wiper motor 43 for low speed operation.

When the wiper motor 43 is energized, it rotates the drive shaft 48 and the annular drive member 53 in the direction of the arrow 27. During the first 180° of rotation of the annular drive member 53, it will rotate relative to the crank assembly 23 and with the cam follower 70 following the contour of the cam track 58. During this relative rotation, the throw of the crank arm 24 is decreased from radius $r_2$ toward radius $r_1$, which in turn causes the wipers 15 to be moved from their park position toward their inboard position. When the wipers 15 are in their inboard position, which occurs when the annular drive member 53 is rotated 180°, the cam follower 70 will be aligned with the cut out 86. When this occurs the spring 95 will move the worm gear 46, drive shaft 48 and collar 72 in an upward direction toward the position shown in FIG. 2. As the collar 72 is moved in an upward direction it causes the cam follower 70 to be moved from its second position, as shown in FIGS. 3 and 4, toward its first position, as shown in FIG. 2, in which it is received within the recess 75 in the annular drive member. To aid in guiding the cam follower 70 into the recess 75, the cam follower is axially tapered on its upper side and the recess is axially tapered inwardly in a complementary manner.

When the cam follower 70 is disposed within the recess 75, the crank assembly 23 is drivingly connected to the annular drive member 53 so that further rotation of the latter causes the crank assembly 23 to be rotated about the axis of the annular drive member 53, which in turn causes the wipers to be oscillated between their inboard and outboard positions I and O. Since the cam follower 70 is eccentric with respect to the axis of the crank shaft 60, the latter cannot be rotated when the cam follower 70 is received within the recess 75 and thus, the crank assembly 23 is drivingly connected to the annular drive member 53.

When the wiper switch bringing member 112 is moved from its low speed position to its off position to terminate wiper operation, the aforedescribed circuit for the park switch relay 113 is broken, since the bringing member 112 disengages the stationary contact 110 in its off position. The wiper motor 43, however, remains energized until the wipers 15 reach their park position, since the leaf spring 85c of the park switch 85 is self-biased toward a closed position during running operation of the wipers 15 and since the cam follower 70 is not in the cam track 58 and thus disengaged therefrom, as shown in FIG. 2. The park switch 85 remains closed until the windshield wiper motor 43 moves the wipers 15 to their park position at which time the cam follower 70 will open the park switch to de-energize the circuits for the wiper motor 43. Also, when the bridging member 112 is moved to its off position, the valve member 114 is moved to its second position in which it communicates the inlet manifold with chamber 93 via conduit 94. When this occurs, the shiftable means 90 is shifted from its position shown in FIG. 2 towards its position shown in FIG. 3.

If the windshield wipers 15 are not in their inboard position I when the bridging member 112 is moved to its off position and the valve member 114 is moved to communicate the inlet manifold with the chamber 93, the shiftable means 90 is prevented from being moved towards its lower position, as shown in FIG. 3, due to the fact that the cam follower 70 cannot be received within the cam track 58, since it will engage the upper side of the flange 83. Thus, the annular drive member and the crank assembly 23 remain locked together until the cam follower 70 is aligned with the cut out 86 in the annular cam track 58. When the cam follower 70 is aligned with the cut out 86, the wipers 15 are in their inboard position I and the vacuum pressure on the underside of the worm gear 46 will cause the shiftable means 90 to be moved downwardly to cause the cam follower 70 to be received within the cam track 58. This disengages the drive connection between the annular drive member 53 and the crank assembly 23 with the result that continued rotation of the annular drive member 53 through 180° of rotation causes the drive member 53 to rotate relative to the crank assembly 23 and causes the crank assembly 23 to be shifted from its position shown in FIG. 3 towards its position shown in FIG. 4 and its effective radius or throw to be increased to radius $r_2$ to cause the wipers 15 to be moved from their inboard position I to their park position P. When the wipers reach their park position P, the cam follower 70 will engage the park switch to open the same and thus de-energize the wiper motor.

When the operator desires high speed operation, he will move the bridging member 112 of the wiper switch 107 to its high speed position, as indicated by the phantom lines in FIG. 7. Movement of the bridging member 112 to this position causes only the stationary contact 110 of the wiper switch 107 to be bridged. When in this position the hereinbefore described circuits for energizing the park switch relay 113 and the series field windings 102 and armature 101 of the wiper motor 43 are completed. The hereinbefore described circuit for energizing the shunt field windings 103 to ground $G_2$ is not completed, since the bridging member 112 does not bridge the contacts 108 and 110 in the high speed position. When the bridging member 112 is in its high speed position, the shunt field windings 103 are energized via a circuit through the resistor 105 to ground $G_4$ whereby the shunt field windings are only partially energized which causes the wiper motor to operate at high speed, and in a manner well known to those skilled in the art. The latter circuit is from battery 100, wire 117, now closed ignition switch 104, wire 118, circuit breaker 120, wire 121, park switch 85, wire 125, shunt field windings 103, wire 135, resistor 105, wire 136 to ground $G_4$.

The manner in which the actuating mechanism 20 effects movement of the wipers 15 to their park position P when wiper operation is being terminated and from their park position P to their inboard position I when wiper operation is being initiated is the same for high speed operation as previously described for low speed operation.

Although the illustrated embodiment thereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. An actuating mechanism for use in oscillating a windshield wiper across the windshield between inboard and outboard positions during running operation and for moving the wiper to a park position spaced from the inboard position when wiper operation is being terminated comprising: a housing means; an annular drive member rotatably supported by said housing means; a drive shaft supported by said housing means for rotational and axial sliding movement relative thereto, said drive shaft being drivingly connected with said drive member and axially movable relative thereto while maintaining said driving connection therebetween; a drive means operatively connected with said drive shaft for rotating the same and said drive member; a crank assembly including a crank arm which is adapted to be operatively connected with the wiper and a crank shaft eccentrically and rotatably supported by said drive member; a stationary cam track carried by said housing means and with the cam track being eccentric with the axis of rotation of said drive member; an eccentric cam follower means carried by said crank shaft; and means for shifting said drive shaft and said cam follower means between a first position in which said cam follower means drivingly engages said annular drive member to cause said crank assembly to be rotated with said drive member about the axis of the latter during running operation and a second position in which said cam follower means disengages said annular member and is received in said cam track to cause said annular member and said crank assembly to rotate relative to each other to increase the throw of the crank arm to move the wipers from their inboard position towards their park position when running operation is being terminated.

2. An actuating mechanism for use in oscillating a windshield wiper across the windshield between inboard and outboard positions during running operation and for moving the wiper to a park position spaced from the inboard position when wiper operation is being terminated comprising: a housing means; an annular drive member rotatably supported by said housing means; a drive shaft supported by said housing means for rotational and axial sliding movement relative thereto, said drive shaft being drivingly connected with said drive member and axially movable relative thereto while maintaining said driving connection; a drive means operatively connected with said drive shaft for rotating the same and said drive member; a crank assembly including a crank arm which is adapted to operatively connect with the wiper and a crank shaft which is supported by said annular drive member at an eccentric location for both rotational and axial movement relative thereto; a stationary cam track carried by said housing means and with the cam track being eccentric with respect to the axis of rotation of said annular drive member; an annular cam follower means eccentrically supported by said crank shaft; said crank assembly being shiftable axially of said annular drive member between a first position in which said eccentric cam follower is received in a complementary shaped opening in the annular drive member to cause the crank assembly and annular drive member to be rotated in unison about the axis of the annular drive member during running operation of the wiper and a second position in which said eccentric cam follower is disengaged from the annular drive member and received within the cam track which causes said annular drive member to rotate relative to the crank assembly to cause the crank arm to be radially shifted with respect to the annular drive member to increase the thrown of the crank arm and move the wipers toward their park position when wiper operation is being terminated, means carried by said drive shaft cooperably engageable with said eccentric cam follower for shifting the same between its positions in response to movement of the drive shaft and means operatively associated with the drive shaft for effecting shifting movement of the drive shaft and the cam follower means between its positions.

3. An actuating mechanism for use in oscillating a windshield wiper across the windshield between inboard and outboard positions during running operation and for moving the wiper to a park position spaced from the inboard position when wiper operation is being terminated comprising: a housing means; an annular drive member rotatably supported by said housing means; a drive shaft supported by said housing means for rotational and axial sliding movement relative thereto, said drive shaft being drivingly connected with said drive member and axially movable relative thereto while maintaining said driving connection; a drive means including a worm gear fixed to said drive shaft for rotating the same and said drive member; said crank assembly including a crank arm which is adapted to operatively connect with the wiper and a crank shaft which is supported by said annular drive member at an eccentric location for both rotational and axial movement relative thereto; a stationary cam track carried by said housing means and with the cam track being eccentric with respect to the axis of rotation of said annular drive member; an annular cam follower means eccentrically supported by said crank shaft; said crank assembly being shiftable axially of said annular drive member between a first position in which said eccentric cam follower is received in a complementary shaped opening in the annular drive member to cause the crank assembly and annular drive member to be rotated in unison about the axis of the annular drive member during running operation of the wiper and a second position in which said eccentric cam follower is disengaged from the annular drive member and received within the cam track which causes said annular drive member to rotate relative to the crank assembly to cause the crank arm to be radially shifted with respect to the annular drive member to increase the throw of the crank arm and move the wipers toward their park position when wiper operation is being terminated, a collar carried by said drive shaft and cooperably engageable with said eccentric cam follower for shifting the same between its positions in response to movement of the worm gear and drive shaft, spring means operatively engaged with said worm gear for biasing said crank assembly toward its first position, and means for communicating one side of said worm gear with a vacuum source to effect movement of the crank assembly toward its second position when wiper operation is being terminated.

* * * * *